United States Patent
Whitney et al.

[11] Patent Number: 6,086,840
[45] Date of Patent: Jul. 11, 2000

[54] PROCESS FOR MAKING AMMONIA FROM HETEROGENEOUS FEEDSTOCK

[76] Inventors: John P. Whitney, 537 Vulcan Rd., Haskell, Ark. 72015; Ashok D. Rao, 50 Segada, Rancho Santa Margarita, Calif. 92688

[21] Appl. No.: 09/200,150

[22] Filed: Nov. 25, 1998

[51] Int. Cl.$^7$ ...................................................... C01C 1/04
[52] U.S. Cl. .......................... 423/359; 422/148; 422/198; 422/200; 423/650; 423/655
[58] Field of Search .................. 423/648.1, 650, 423/359, 655; 422/148, 198, 200

[56] References Cited

U.S. PATENT DOCUMENTS

| | | | |
|---|---|---|---|
| 4,409,196 | 10/1983 | Skinner et al. | 423/359 |
| 4,414,191 | 11/1983 | Fuderer | 423/359 |
| 4,524,056 | 6/1985 | Banquy | 423/359 |
| 4,553,981 | 11/1985 | Fuderer | 423/359 |
| 4,572,829 | 2/1986 | Fuderer . | |
| 4,592,860 | 6/1986 | Fuderer . | |
| 4,695,442 | 9/1987 | Pinto et al. | 423/359 |
| 4,725,380 | 2/1988 | Pinto . | |
| 4,725,381 | 2/1988 | Pinto | 423/359 |
| 4,755,361 | 7/1988 | Fuderer | 423/359 |
| 4,780,298 | 10/1988 | Kowal | 423/359 |
| 5,041,144 | 8/1991 | Lath . | |
| 5,252,609 | 10/1993 | Pinto . | |
| 5,254,368 | 10/1993 | Kadlec et al. . | |
| 5,669,960 | 9/1997 | Couche | 423/359 |

*Primary Examiner*—Wayne Langel
*Attorney, Agent, or Firm*—Troutman Sanders LLP

[57] ABSTRACT

Ammonia is made from a carbon-containing heterogeneous feedstock by partially oxidizing the feedstock at low pressure to generate a synthesis gas containing CO; isothermally shift reacting the synthesis gas with steam to form $H_2$; cryogenically removing portions of the $CO_2$ and Ar from the shifted gas; purifying the $H_2$ in a pressure swing adsorber; mixing the purified $H_2$ with high purity $N_2$; and converting the $H_2$ and $N_2$ into ammonia. The tail stream from the pressure swing adsorber can be recycled with the synthesis gas for control purposes and/ or used as boiler fuel. The reduced volume of purge gas purged from the ammonia synthesis loop allows ammonia contained in the purge gas stream to be recovered by cryogenic condensing.

20 Claims, 1 Drawing Sheet

PROCESS FOR MAKING AMMONIA FROM HETEROGENEOUS FEEDSTOCK

BACKGROUND OF THE INVENTION

1. Field of Invention

This invention relates to processes for making ammonia. More specifically, this invention relates to processes for manufacturing ammonia on an industrial scale from a heterogeneous feedstock containing a time varying variety of different materials having different carbon contents and including, for example, solid or liquid carbon-containing waste materials.

2. Description of Related Art

Ammonia is produced on an industrial scale by the catalytic conversion of nitrogen and hydrogen at high pressures and temperatures. While the nitrogen typically comes from air, the hydrogen is usually produced by reacting carbon-containing feedstocks with steam (steam reforming) or oxygen (partial oxidation). For example, methane or natural gas can be catalytically steam reformed ($CH_4 + H_2O \rightarrow CO + 3H_2$). In contrast, coal, coke and naphtha or heavy oils, for example, can undergo reactions including partial oxidation ($2C + O_2 \rightarrow 2CO$) and water gas reaction ($C + H_2O \rightarrow CO + H_2$). The steam reforming and partial oxidation reactions form a gas ("synthesis gas"), which usually contains primarily CO and $H_2$, along with a small amount of $CO_2$. The CO in the synthesis gas is combined with steam in the so-called "shift reaction" to form a shifted gas containing $CO_2$ and $H_2$ ($CO + H_2O \rightarrow CO_2 + H_2$). After separating the carbon oxides and other undesired components in the shift gas from the $H_2$, the $H_2$ is combined with $N_2$ to form ammonia.

To separate the carbon oxides in the shifted gas from the $H_2$, a number of processes are conventionally used. For example, the bulk of the $CO_2$ can be removed by absorption (i.e., scrubbing), using suitable physical solvents, such as methanol and esters of oligoethylene glycols, or chemical-type solvents, such as hot potassium carbonate and solutions of amines. Following the absorption treatment, the shifted gas mixture can be passed to a methanation reactor for conversion of carbon oxides to lower levels. The conventional methanation step is essentially the reverse of the steam reforming step, but carried out at lower temperature, wherein CO and $CO_2$ are caused to react with hydrogen to form methane and water ($CO + 3H_2 \rightarrow CH_4 + H_2O$; $CO_2 + 4H_2 \rightarrow CH_4 + 2H_2O$).

Alternatively, carbon oxides in the shifted gas can be separated from the $H_2$ used for ammonia synthesis through the use of pressure swing adsorption ("PSA") techniques. A PSA system is capable of selectively adsorbing $CO_2$, CO, $CH_4$ and other impurities from $H_2$ and from a portion of any $N_2$ present in the shifted gas mixture leaving the shift reactor. In most known PSA systems, the product gas is not discharged continuously, and therefore, a plurality of adsorbent beds are provided in parallel with one another to achieve a measure of continuity in the product output flow. In the PSA separation process of each adsorption bed, at least one selectable component of the feed gas mixture is adsorbed so that the gas discharged at the other end of the adsorption bed is the component-depleted product gas. Generally, such adsorption occurs at the highest pressure of the process, which is generally the input feed pressure. This high pressure portion of the separation process cycle is followed by a depressurization portion of the cycle wherein the gas within the adsorption bed is reversed in its direction of flow and released at the inlet end of the adsorption bed. The gas which is thus exhausted is rich with the desorbate, which corresponds to the component of the feed gas which has been adsorbed and is released upon reduction in the pressure. In certain known systems, the depressurized exhaust portion of the cycle is followed by introduction of a purge gas at the product outlet end of the adsorption. A new cycle is commenced with the introduction once again of pressurized feed gas after purging has been completed.

After carbon oxides and other impurities are removed from the shifted gas, in conventional processes, the $H_2$ in the shifted gas is reacted with $N_2$ that has accompanied the $H_2$ through the shift reactor. This is accomplished by compressing the $H_2$ and $N_2$ and feeding these gases into an ammonia synthesis unit where the $H_2$ and $N_2$ are converted into ammonia ($3H_2 + N_2 \rightarrow 2NH_3$). As the yield of this ammonia synthesis reaction is typically considerably less than 100%, $NH_3$ in the product stream exiting the ammonia synthesis unit is collected from the product stream by cooling and condensation, and at least a portion of the unreacted $H_2$ and $N_2$ in the product stream is recycled through the ammonia synthesis unit.

U.S. Pat. No. 4,572,829 discloses a process in which a reformed gas mixture to be employed for ammonia synthesis is purified, following shift conversion, by the selective catalytic oxidation of residual carbon monoxide and the selective adsorption of carbon dioxide and water so as to render unnecessary the methanation of carbon oxides.

U.S. Pat. No. 4,592,860 discloses a process and apparatus for ammonia synthesis gas production using a PSA system.

U.S. Pat. No. 4,725,380 discloses the production of ammonia synthesis gas by partial oxidation of a hydrocarbon feed stock, using air, oxygen enriched air, or oxygen depleted air, in admixture with steam, followed by shift and the removal of the excess of nitrogen, and also impurities such as carbon oxides and methane, by pressure swing adsorption.

U.S. Pat. No. 5,252,609 discloses synthesis gas production comprising primary catalytic steam reforming a first stream of desulfurized hydrocarbon feed stock, optionally followed by secondary reforming using an oxygen-containing gas, and then cooling; adiabatically low temperature steam reforming a second stream of the feed stock, preferably adding a hydrogen-containing gas, and then subjecting the product to partial oxidation with an oxygen-containing gas, and then cooling; and mixing the cooled products.

U.S. Pat. No. 5,254,368 discloses a periodic chemical processing system with a single-bed rapid cycle PSA device.

The disclosure of each of the above U.S. patents is incorporated herein by reference in its entirety.

Conventional processes for ammonia synthesis rely on the regulation of the feed rate of only a few, fixed composition, feedstock components. However, these conventional processes are not designed to operate with a heterogeneous feedstock. The term "heterogeneous feedstock" as used herein refers to a non-homogeneous carbon-containing feedstock, containing a mixture of dissimilar feedstock components, in which the composition of the feedstock can vary widely over time as the result of variations in the composition of one or more of the feedstock components and/or variations in the relative amounts of the components in the feedstock.

There is a need for a process for making ammonia from a heterogeneous feedstock.

SUMMARY OF THE INVENTION

This invention provides a process for making ammonia from a heterogeneous feedstock. The process partially oxidizes, at low pressure, the heterogeneous feedstock to form a synthesis gas containing CO among other components such as $CO_2$ and $H_2$; compresses this gas; isothermally shifts the CO and steam to form a shifted gas containing $CO_2$ and $H_2$; preferably removes at least a portion of the $CO_2$ and most preferably less than 80% and greater than 60% of the $CO_2$ and then passes the shifted gas through a pressure swing adsorber to separate a high purity $H_2$ stream from a tail stream containing residual carbon oxides and $H_2$; and reacts a mixture of the high purity $H_2$ stream and a high purity $N_2$ stream to form an ammonia product stream.

The removal of the $CO_2$ upstream of the pressure swing absorber may be accomplished using a suitable process such as, for example, the cryogenic process disclosed by Reddy in the US Patent Application (60/070781 dated Jan. 8, 1998), incorporated herein by reference, or a solvent based system. It was discovered that by utilizing the process as disclosed by Reddy upstream of the pressure swing adsorption unit, a number of advantages may be realized as described in the following:

The Ar removal may range from 10 to as much as 40 percent and thus, the recovered $H_2$ stream from the pressure swing adsorption unit will be depleted of Ar, reducing a build-up of Ar within the ammonia synthesis unit. The reduced inerts concentration within the ammonia synthesis loop reduces the purge gas rate and reduces the optimum operating pressure of the synthesis unit, resulting in higher ammonia production and reduced operating and capital costs, especially of compression. A portion of the recovered $CO_2$ may be utilized for inerting purposes, the Ar accompanying it will not effect unfavorably the characteristics of the $CO_2$ stream since Ar has a molecular weight very close to that of $CO_2$.

Another synergy that results as a consequence of utilizing this cryogenic process is due to the requirement for high inlet gas pressure by the pressure swing adsorption unit. In the cryogenic process, the gases are expanded to a pressure suitable for the pressure swing adsorption unit which is significantly higher than atmospheric. This increases the amount of $CO_2$ condensed from the gas phase in the cryogenic unit. Yet another synergy that exists is also due to the pressure swing absorber unit's requirement for the high inlet gas pressure: the liquid $CO_2$ is stored at a pressure above 200 psi while the inlet pressure to the pressure swing adsorption unit is much in excess of 200 psi, this pressure difference works to the benefit of producing ultra pure $CO_2$ by essentially distilling off the dissolved impurities including the Argon, an inert gas stream.

From the ammonia synthesis unit, two streams are purged, one stream containing much higher concentration of ammonia than the other stream. The relatively small volume of the ammonia rich low pressure gas stream from the ammonia synthesis loop makes it feasible to recover ammonia product from the flash gas by cryogenic condensation, thus increasing the recovery of anhydrous ammonia above what is possible conventionally. The stream after cryogenic separation may be combined with the second reduced purge stream and the remaining portions of ammonia may be recovered by aqua wash.

BRIEF DESCRIPTION OF THE DRAWINGS

The preferred embodiments of this invention will be described in detail, with reference to the following FIGURE, wherein.

DETAILED DESCRIPTION OF PREFERRED EMBODIMENTS

Figure 1:
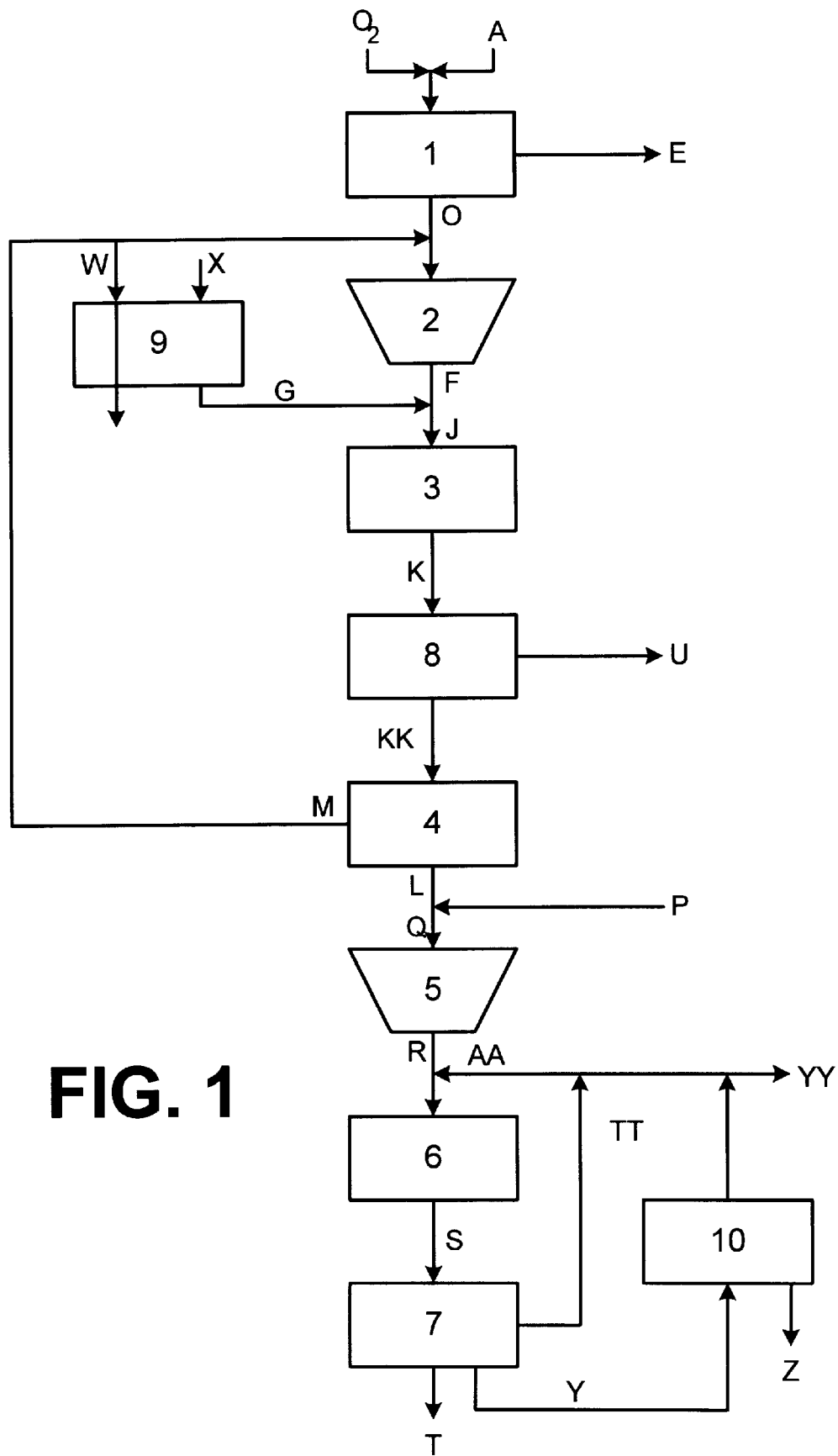
FIG. 1 is a schematic of an embodiment of the present invention.

A detailed description of the present invention, as embodied in the following illustrative example, is provided below.

EXAMPLE

FIG. 1 is a process schematic detailing embodiments of the present invention. A carbon-containing heterogeneous feedstock stream A is fed along with an oxygen stream B to gasifier in the gasifier/gas cleanup unit 1. Solid and liquid carbon-containing waste materials containing large amounts of inorganic material are processible as heterogeneous feedstock A according to the present invention, as long as the net heating value of the heterogeneous feedstock A is greater than about 3,000 Btu/lb. Examples of the carbon-containing waste material that can be processed according to the present invention include oil-contaminated dirt, demolition debris, respirator masks, paint and contaminated rags.

In gasifier/gas cleanup unit 1, carbon in heterogeneous feedstock A is partially oxidized to form a synthesis gas D containing primarily CO. After partial oxidation of carbon in heterogeneous feedstock A, the inorganic residue E is removed from the gasifier/gas cleanup unit 1. The inorganic residue E contains the inorganic material present in the heterogeneous feedstock A. The inorganic residue E can include, for example, steel, glass and concrete. The present invention is not limited by the composition of the inorganic residue E.

The gasifier/gas cleanup unit 1 is operated at low pressure so that feedstock solids of a large size, i.e., drums, supersacks, etc., can be fed to the gasifier unit 1. In embodiments, an open pathway is maintained from the heterogeneous feed stock A in the gasifier/gas cleanup unit 1 to the atmosphere outside of the gasifier unit 1 so that the pressure inside the gasifier unit 1 remains at approximately atmospheric pressure (0 psig). The pressure in gasifier/gas cleanup unit 1 can range between, for example, about 0 psig and about 50 psig. The temperature in the gasifier can range between, for example, about 2000° F. and about 3000° F.

In embodiments, the carbon content in the heterogeneous feedstock A is varied by more than about 10 weight % points of the heterogeneous feedstock over a 24-hour period. In other embodiments, the carbon content of the heterogeneous feedstock A is varied by more than about 30 weight % points of the heterogeneous feedstock A over a 24-hour period.

In embodiments, the heterogeneous feedstock A can comprise less than about 50 weight % of carbon as free carbon or in combination with other elements. However, at least about 10 weight % of the heterogeneous feed stock must be in the form of carbon for the present invention to be operable.

Because the heating value, carbon-hydrogen ratio, water content and acid radicals in the heterogeneous feedstock A are not fixed or closely regulated during the partial oxidation in the gasifier/gas cleanup unit 1, the composition and quantity of the synthesis gas D produced by the gasifier/gas cleanup unit 1 can vary considerably.

Synthesis gas D, containing CO, $H_2$ and $CO_2$, is drawn from gasifier/gas cleanup unit 1 and fed to synthesis gas compressor 2. Although the synthesis gas D contains primarily CO and $H_2$, lesser amounts of $CO_2$, $N_2$ and other gases, such as Ar, may also be present.

Synthesis gas compressor 2 compresses the synthesis gas D to a pressure of 350 psig or more to form a compressed synthesis gas F. In embodiments, synthesis gas compressor 2 can compress the synthesis gas to a pressure of approximately 500 psig.

Pressurized steam G is then mixed with the compressed synthesis gas F to form a wet compressed synthesis gas J. Steam G is added as necessary to adjust the temperature of wet compressed synthesis gas J to the correct water/dry gas ratio and the correct temperature for the shift catalyst, as in all conventional ammonia processes. Typically, the water/dry gas ratio preferably ranges between, for example, about 2 and about 4, and the temperature of the shift catalyst preferably ranges between about 400° F. and about 500° F. Steam G can be at a temperature of between about 600° F. and about 750° F., and at a pressure between about 350 psig and about 600 psig.

The wet compressed synthesis gas J is then fed to shift reactor unit 3. In shift reactor unit 3, the CO and $H_2O$ in the wet compressed synthesis gas J undergoes the shift reaction ($CO + H_2O \rightarrow CO_2 + H_2$) to form a shifted gas K containing $CO_2$ and $H_2$. The shift reaction in shift reactor unit 3 is carried out isothermally, rather than adiabatically, because the CO concentration in wet compressed synthesis gas J fluctuates too much to accomplish temperature moderation by controlling the inlet temperature to the shift reactor or the steam to gas ratio, as in conventional adiabatic processes or by recycling gases. Shift reactor unit 3 can be maintained under essentially isothermal conditions by cooling the catalyst bed in shift reaction unit 3 with water passing through tubes immersed in the bed and under such pressure that the water boils, raising steam.

Shifted gas K is then cooled and fed to a cryogenic unit 8 for $CO_2$ recovery (stream U). The gases KK rich in $H_2$ leaving the $CO_2$ recovery unit are then fed to the pressure swing adsorption unit 4. Pressure swing adsorption unit 4 separates the components of $H_2$ rich gas KK into a high purity $H_2$ stream L without any carbon oxides (or a mixture of $H_2$ and $N_2$ without any carbon oxides when $N_2$ is used as the sweep gas in the pressure swing adsorption unit to regenerate the adsorbents), and a first tail stream M comprising $CO_2$, less than about 20% $H_2$ (and $N_2$ when $N_2$ is used as the sweep gas in the pressure swing adsorption unit to regenerate the adsorbents in this unit). This tail stream may be utilized as fuel to the boiler 9. In embodiments, high purity $H_2$ stream L comprises at least 99% $H_2$ when $N_2$ is not used as the sweep gas, or a mixture of $H_2$ and $N_2$ when $N_2$ is used as the sweep gas. The pressure swing adsorption unit 4 maintains the $H_2$ concentration in the high purity $H_2$ stream L above about 99%, preferably above about 99.9% expressed on a $N_2$ free basis, regardless of system upset or turndown, that is, when the feed rate to the gasifier or to the pressure swing adsorption unit is reduced.

The gas stream L which is a mixture of $H_2$ and $N_2$ when $N_2$ is used as sweep gas or high purity $H_2$ stream when $N_2$ is not used as the sweep gas is mixed with a high purity $N_2$ stream P, containing at least 99% $N_2$, preferably at least 99.99% $N_2$, to form a mixed stream Q having a molar ratio of about 3 moles of $H_2$ to about 1 mole of $N_2$. The high purity $N_2$ stream is provided by the air separation unit that also provides high purity $O_2$ for the gasifier. The mixed stream Q is then compressed in compressor 5 to a pressure of between about 1500 psig and 3000 psig to form a compressed mixed stream R.

Compressed mixed stream R is then fed to ammonia synthesis unit 6, where at least part of the $H_2$ and the $N_2$ in the compressed mixed stream R is converted into ammonia. The pressure in ammonia synthesis unit 6 ranges between, for example, about 1500 psig and about 3000 psig.

The adsorbents and catalysts employed in gasifier/gas cleanup unit 1, shift reactor unit 3 and ammonia synthesis unit 6 are well known to the skilled artisan. Examples of conventional adsorbents/catalysts include, for example: activated carbon in the gasifier/gas cleanup unit 1; copper based catalyst for the shift reactor unit 3; and iron based catalyst for the ammonia synthesis unit 6.

Tail stream M may be recycled by mixing with synthesis gas D whenever the production of synthesis gas D in gasifier unit 1 is less than a maximum that can be produced by gasifier unit 1 or in order to maintain a constant pressure and flowrate at the inlet of the syn gas compressor.

Product stream S from ammonia synthesis unit 6 is fed to refrigerated (chiller) condenser and separation system 7, which separates gas stream TT from first ammonia product stream T using conventional refrigeration techniques. The pressure of product stream S can range between, for example, about 1500 psig and about 3000 psig, and a temperature in chiller condenser 7 can range between, for example, about −55° F. and about 45° F.

In embodiments of the present invention, however, the gas stream TT is divided into (1) a first purge stream SS which may be optionally fed to cryogenic condenser 10, where second ammonia product stream Z may be separated and producing a second purge stream YY or directly purged from the system as stream SS, and (2) a recycle gas stream AA which is mixed with compressed mixed stream R before being recycled into ammonia synthesis unit 6. The high pressure ammonia stream first separated in the chiller condenser/separation unit is reduced in pressure while producing a second purge stream Y which is fed to the cryogenic condenser 10 producing the second ammonia product stream Z. Gas leaving the cryogenic condenser 10 constitutes the third purge stream YY. The purge stream YY may be treated in an aqua wash system (not shown in FIG. 1) to recover the remaining ammonia contained in the stream while producing aqua ammonia product. Since the demand for the aqua ammonia product is seasonal, the configuration disclosed herein provides flexibility for controlling the amount of the anhydrous ammonia product and the aqua ammonia product produced by the plant by controlling the amount of purge gas or gasses entering the cryogenic condenser 10. Because of the reduced volume of second ammonia-containing purge stream Y, in comparison with conventional processes, it is economically possible to recover from the ammonia synthesis loop the ammonia product Z contained in purge stream Y by cryogenic condensation.

In embodiments, the present invention does not include a step of removing $CO_2$ from the shifted gas K or the first tail stream M by using a $CO_2$ absorber/scrubber. In addition, in embodiments, the present invention does not include a methanation step of converting $O_2$, $CO_2$ and CO in the feed gas stream L to the ammonia unit which forms $CH_4$ and $H_2O$ because of the very high purity of stream L (on a $N_2$ free basis) produced by the pressure swing adsorption unit 4. Because $CH_4$ from methanation dilutes compressed mixed stream R when it enters ammonia synthesis unit 6, this embodiment, relative to conventional processes, (1) reduces the ammonia synthesis pressure required for the same conversion efficiency per pass through ammonia synthesis unit 6 by about one fourth (i.e., 2450 psig to 1750 psig), (2) reduces the purge fraction necessary to minimize the argon build up within the synthesis unit 6, and (3) increases the ammonia recovery by reducing the losses in first purge stream SS and second purge stream Y.

Having now fully described the invention, it will be apparent to one of ordinary skill in the art that many changes and modifications can be made thereto without departing from the spirit or scope of the invention as set forth herein.

It is the synergistic combination of the units 1 through 10 that provide advantages over conventional schemes for the processing of heterogeneous feeedstock with varying composition and heating value.

What is claimed is:

1. A process for producing ammonia comprising the steps of:
   introducing oxygen and a carbon containing heterogeneous feedstock into a gasifier to generate a synthesis gas stream comprising at least carbon monoxide and hydrogen;
   reacting a portion of the carbon monoxide comprising said synthesis gas stream with water via a shift reaction to produce a shifted gas stream comprising carbon dioxide and hydrogen;
   passing said shifted gas stream through a cryogenic carbon dioxide recovery unit to remove a first portion of carbon dioxide from said shifted gas stream;
   passing the shifted gas stream from said cryogenic carbon dioxide recovery unit through a pressure swing adsorber to remove a second portion of carbon dioxide from said shifted gas stream to produce a hydrogen stream;
   mixing said hydrogen stream with a nitrogen stream to form a mixed stream having a desired ratio of hydrogen to nitrogen; and
   converting a portion of said mixed stream into ammonia.

2. The process of claim 1, further including the step of determining the flow rate of said hydrogen stream and adjusting the flow rate of said nitrogen stream in response thereto to maintain a predetermined ratio of hydrogen to nitrogen in said mixed stream.

3. The process of claim 1 wherein said hydrogen stream includes greater than approximately 99 percent hydrogen expressed on a nitrogen free basis.

4. The process of claim 1, wherein said shift reaction is accomplished using a shift catalyst in an isothermal shift reactor.

5. The process of claim 1, wherein said isothermal shift reactor includes heat exchange tubes extending therethrough wherein a coolant may be boiled to remove excess heat from said shift reactor.

6. The process of claim 1, wherein said shifted gas stream also comprises an inert gas and wherein a first portion of said inert gas is removed from said shifted gas stream during said cryogenic carbon dioxide recovery step.

7. The process of claim 6, wherein said inert gas is argon and wherein greater than about 10% of said argon is removed from said shifted gas stream during said cryogenic carbon dioxide recovery step.

8. The process of claim 1, wherein said pressure swing adsorber also produces a tail stream comprising carbon dioxide and less than about 20 percent hydrogen and further including the step of recycling said tail stream by mixing said tail stream with said synthesis gas stream.

9. The process of claim 1, further including the step of condensing a first portion of said ammonia to produce a first ammonia product stream and a first ammonia containing gas stream wherein said first ammonia containing gas stream is recycled by mixing said first ammonia containing gas stream with said mixed stream prior to said converting step.

10. The process of claim 9, wherein said condensing step further includes the step of removing a low pressure purge stream from said first ammonia containing gas stream.

11. The process of claim 10, further including the step of condensing a portion of ammonia from said low pressure purge stream to produce a second ammonia product stream and a second purge stream.

12. The process of claim 11, further including the step of recovering a portion of ammonia from said second purge stream by aqua wash to produce a third ammonia product stream.

13. The process of claim 1, wherein said pressure swing adsorber also produces a tail stream comprising carbon dioxide and hydrogen and further including the step of recycling said tail stream by using at least a portion of said tail stream as a boiler fuel.

14. A system for producing ammonia from a heterogeneous carbon-containing feedstock, said system comprising:
    a gasifier for receiving oxygen and said heterogeneous carbon-containing feedstock and for converting said oxygen and carbon containing heterogeneous feedstock into a synthesis gas stream comprising at least carbon monoxide and hydrogen;
    a shift reactor for receiving water and said synthesis gas stream and for converting, via a shift reaction, said water and a portion of said carbon monoxide contained in said synthesis gas stream into a shifted gas stream comprising carbon dioxide and hydrogen;
    a cryogenic carbon dioxide recovery unit for receiving said shifted gas stream and for removing a first portion of carbon dioxide from said shifted gas stream;
    a pressure swing adsorber for removing a second portion of carbon dioxide from said shifted gas stream to produce a hydrogen stream from said cryogenic carbon dioxide recovery unit; and
    an ammonia synthesis reactor having an ammonia synthesis catalyst, said ammonia synthesis reactor being operable to receive said hydrogen stream and a nitrogen stream and to react said hydrogen stream with said nitrogen stream to form an ammonia stream.

15. The system of claim 14, wherein the flow rate of said hydrogen stream is variable in response to fluctuations in the composition of said heterogeneous feedstock and wherein the flow rate of said nitrogen stream into said ammonia synthesis reactor is adjustable in response to variations in said hydrogen stream flow rate in order to maintain a ratio of hydrogen to nitrogen within said ammonia synthesis reactor that is approximately stoichiometric for the production of ammonia.

16. The system of claim 14, wherein said shift reactor is an isothermal shift reactor including heat exchange tubes wherein cooling water is boiled to remove excess heat from said shift reactor to maintain said shift reactor at an approximate predetermined temperature.

17. The system of claim 14, wherein said shifted gas stream also comprises an inert gas and wherein said cryogenic carbon dioxide recovery unit is operable to remove a first portion of said inert gas from said shifted gas stream.

18. The system of claim 17, wherein said inert gas is argon and wherein said cryogenic carbon dioxide recovery unit is operable to remove greater than about 10% of said argon from said shifted gas stream.

19. The system of claim 14, further including a first condenser for condensing a first portion of said ammonia to produce a first ammonia product stream and a first ammonia containing gas stream wherein said first ammonia containing gas stream is recycled into said ammonia synthesis reactor.

20. The system of claim 19, wherein a first purge stream is removed from said first condenser and directed to a second condenser which is operable to condense a portion of ammonia from said first purge stream to produce a second ammonia product stream.

* * * * *